US009611831B2

(12) United States Patent
Duchene et al.

(10) Patent No.: US 9,611,831 B2
(45) Date of Patent: Apr. 4, 2017

(54) MARINE TURBINE COMPRISING A STATOR, A ROTOR, A FIRST MAGNETIC BEARING SUPPORTING THE ROTOR AND A SECOND SUPPORT BEARING WITH ROLLING ELEMENT(S)

(71) Applicant: GE ENERGY POWER CONVERSION TECHNOLOGY LIMITED, Warwickshire, Warwickshire (GB)

(72) Inventors: Hugo Duchene, Nancy (FR); Philippe Cagnin, Champigneulles (FR)

(73) Assignee: GE ENERGY POWER CONVERSION TECHNOLOGY LTD, Warwickshire (GB)

( * ) Notice: Subject to any disclaimer, the term of this patent is extended or adjusted under 35 U.S.C. 154(b) by 0 days.

(21) Appl. No.: 14/377,055

(22) PCT Filed: Feb. 1, 2013

(86) PCT No.: PCT/EP2013/052083
§ 371 (c)(1),
(2) Date: Aug. 6, 2014

(87) PCT Pub. No.: WO2013/117502
PCT Pub. Date: Aug. 15, 2013

(65) Prior Publication Data
US 2015/0008676 A1  Jan. 8, 2015

(30) Foreign Application Priority Data

Feb. 6, 2012  (FR) ...................................... 12 51082

(51) Int. Cl.
*H02K 7/00* (2006.01)
*F03B 13/00* (2006.01)
(Continued)

(52) U.S. Cl.
CPC .............. *F03B 13/10* (2013.01); *F03B 11/06* (2013.01); *F03B 11/063* (2013.01);
(Continued)

(58) Field of Classification Search
CPC ..... H02K 7/09; F16C 39/063; F16C 32/0402; F05B 2240/97; F03B 13/10; F03B 11/06; F03D 5/02
(Continued)

(56) References Cited

U.S. PATENT DOCUMENTS 4,870,310 A * 9/1989 Triplett ........................... 310/74
5,302,874 A * 4/1994 Pinkerton .................... 310/90.5
(Continued)

FOREIGN PATENT DOCUMENTS

DE  20116649   12/2001
EP  1426639    6/2004
(Continued)

OTHER PUBLICATIONS

International Search Report dated May 3, 2013 which was issued in connection with PCT Patent Application No. PCT/EP2013/052083 which was filed on Feb. 1, 2013.

*Primary Examiner* — Julio C. Gonzalez Ramirez
(74) *Attorney, Agent, or Firm* — GE Global Patent Operation; Scott R. Stanley

(57) ABSTRACT

A marine turbine comprising a stator, a rotor, the rotor being able to be driven in rotation around an axis or rotation by a stream of a liquid, and at least one first bearing for supporting the rotor, the or each first bearing, comprising a magnetic stator element secured to the stator and magnetic rotor element secured to the rotor. The marine turbine further comprises at least one second bearing for supporting the rotor, the or each second bearing comprising at least one rolling element.

17 Claims, 4 Drawing Sheets

(51) Int. Cl.
    *F03B 13/10*     (2006.01)
    *F03B 11/06*     (2006.01)
    *F03B 13/26*     (2006.01)
    *F03B 17/06*     (2006.01)
    *F16C 32/04*     (2006.01)
    *H02K 7/09*      (2006.01)
    *F16C 39/06*     (2006.01)
    *F16C 19/50*     (2006.01)

(52) U.S. Cl.
    CPC .......... *F03B 13/264* (2013.01); *F03B 17/061* (2013.01); *F16C 19/507* (2013.01); *F16C 32/0402* (2013.01); *F16C 39/063* (2013.01); *H02K 7/09* (2013.01); *F05B 2220/7066* (2013.01); *F05B 2240/97* (2013.01); *Y02E 10/28* (2013.01); *Y02E 10/38* (2013.01)

(58) Field of Classification Search
    USPC ........................................ 290/54, 55, 44, 43
    See application file for complete search history.

(56) References Cited

U.S. PATENT DOCUMENTS

| | | | |
|---|---|---|---|
| 5,525,849 A * | 6/1996 | Ito et al. | 310/90.5 |
| 5,752,774 A * | 5/1998 | Heshmat et al. | 384/549 |
| 6,710,489 B1 * | 3/2004 | Gabrys | 310/90.5 |
| 6,866,423 B2 | 3/2005 | Faltus et al. | |
| 7,190,087 B2 | 3/2007 | Williams | |
| 7,462,950 B2 * | 12/2008 | Hu | 290/55 |
| 7,964,978 B1 * | 6/2011 | Weissmann | 290/44 |
| 8,109,727 B2 * | 2/2012 | Barber | 416/132 B |
| 8,222,762 B2 * | 7/2012 | Borgen | 290/55 |
| 8,941,278 B2 * | 1/2015 | Aronstam | 310/90.5 |
| 2005/0082839 A1 * | 4/2005 | McCoin | 290/55 |
| 2008/0042504 A1 * | 2/2008 | Thibodeau et al. | 310/90.5 |
| 2010/0126374 A1 * | 5/2010 | Ji | 104/282 |
| 2011/0031760 A1 * | 2/2011 | Lugg | 290/55 |
| 2011/0194669 A1 * | 8/2011 | Tremaine et al. | 378/15 |
| 2011/0235953 A1 * | 9/2011 | Wheals | 384/100 |
| 2012/0211990 A1 * | 8/2012 | Davey et al. | 290/54 |
| 2013/0028390 A1 * | 1/2013 | Kalenyak et al. | 378/197 |
| 2013/0188899 A1 * | 7/2013 | Peterson | 384/548 |
| 2013/0293049 A1 * | 11/2013 | Fan et al. | 310/90.5 |

FOREIGN PATENT DOCUMENTS

| | | |
|---|---|---|
| EP | 1878913 A1 | 1/2008 |
| WO | 2007043894 A1 | 4/2007 |
| WO | 2008021569 | 2/2008 |
| WO | WO 2011059708 A2 * | 5/2011 |

* cited by examiner

MARINE TURBINE COMPRISING A STATOR, A ROTOR, A FIRST MAGNETIC BEARING SUPPORTING THE ROTOR AND A SECOND SUPPORT BEARING WITH ROLLING ELEMENT(S)

BACKGROUND OF THE INVENTION

Field of the Invention

The present invention relates to a hydrokinetic turbine generator comprising: a stator, a rotor, the rotor being capable to be brought in rotation around an rotational axis by a flow of liquid, and at least one first bearing support of the rotor, the one or each first bearing comprising a single-unit magnetic stator element and a single-unit magnetic rotor element.

Description of the Related Art

We know from the document U.S. Pat. No. 7,190,087 B2 that there is a hydrokinetic turbine generator of this type. The rotor of the hydrokinetic turbine generator is supported, on one part, by means of a magnetic bearing comprising a stator magnetic element and a rotor magnetic element, and on the other part, by means of a fine layer of water located between the rotor and the stator. The space between the stator and the rotor is not insulated from the water current, and the fine layer of water comes out following the direction of the axis of rotation when the hydrokinetic turbine generator is in operation.

Nevertheless, such a hydrokinetic turbine generator is only operational when it is immersed, which complicates operation or even testing for proper functioning once it is manufactured.

BRIEF SUMMARY OF THE INVENTION

Therefore, the purpose of embodiments of the invention is to propose a hydrokinetic turbine generator that makes easier its operation and testing for proper functioning.

According to one embodiment of the present invention, there is provided a hydrokinetic turbine generator comprising a stator, a rotor, the rotor being capable to be brought in rotation around an rotational axis by a flow of liquid, at least one first bearing support of the rotor, the one or each first bearing comprising a single-unit magnetic stator element and a single-unit magnetic rotor element, and at least a second supporting bearing of the rotor, the one or each second bearing comprising at least one rolling element.

According to embodiments of the present invention, the hydrokinetic turbine generator comprises one or several of the following characteristics, taken alone or using all combinations that are technically possible: the one or each second bearing comprises a variety of sectors, each sector comprising at least one rolling element, the sectors of a second respective bearing being arranged successively around the axis of rotation so as to form a ring revolving around the axis of rotation; each sector is independently detachable from the sector or sectors of a second respective bearing; the one or each rolling element is mechanically connected to one part, either the stator or the rotor, and resting against the other part, either the stator or the rotor, the one or each rolling element, more particularly, being mechanically connected to the stator and resting against the rotor; the one or each second bearing is suitable for supporting the rotor while also following the direction of the rotation axis and following a direction perpendicular to that of the rotation axis; the one or each rolling element is mobile in rotation around a rolling axis, the rolling axis is arranged in a longitudinal plane parallel to the axis of rotation, and the rolling axis is inclined in relation to the axis of rotation; the angle between the rolling axis and the axis of rotation is always greater than 0° and always lower than 90°, more particularly comprised between 30° and 60°, even more particularly—roughly equal to 45°; the one or each rolling element is mobile in rotation around a rolling axis, the one or each rolling element is cone-shaped, and the rolling axis is parallel to the axis of rotation; the stator comprises an active statoric part and the rotor comprises an active rotoric part, located roughly opposite to the active statoric part in a radial direction perpendicular to the axis of rotation, the active rotoric part being capable of working together with the active statoric part in order to generate a magnetic field when the rotor is in rotation around the axis of rotation, and at least one second bearing and one part, either the stator or the rotor, is a stopping surface, the stopping surfaces located opposite to one another and capable of coming in contact with one another in case of deterioration in at least one rolling element, so that the air gap between the active statoric part and the active rotoric part is always greater than a minimum predetermined value; the hydrokinetic turbine generator comprises two first bearings, the two first bearings being spaced from each other according to the axis of rotation; the hydrokinetic turbine generator comprises two second bearings, the two second bearings being spaced from each other according to the axis of rotation; the stator comprises an active statoric part and the rotor comprises an active rotoric part, located roughly opposite to the active statoric part following a radial direction perpendicular to the axis of rotation, the active rotoric part being capable of working together with the active statoric part in order to generate a magnetic field when the rotor is in rotation around the axis of rotation, and the two first bearings and/or the two second bearings are positioned on the one and the other side of the active statoric and rotoric parts following the axis of rotation; the one or each rolling element is an element from the group consisting of: a roller, a needle and bead; and the one or each second bearing comprises various rolling elements, the various rolling elements being positioned following at least two different rows, each row being roughly arranged according to a plane perpendicular to the axis of rotation.

BRIEF DESCRIPTION OF THE DRAWINGS

These characteristics and advantages of the invention will appear in the description that is to follow, giving only one example without limitations and making reference to the enclosed drawings, among which.

DETAILED DESCRIPTION

Figure 1:
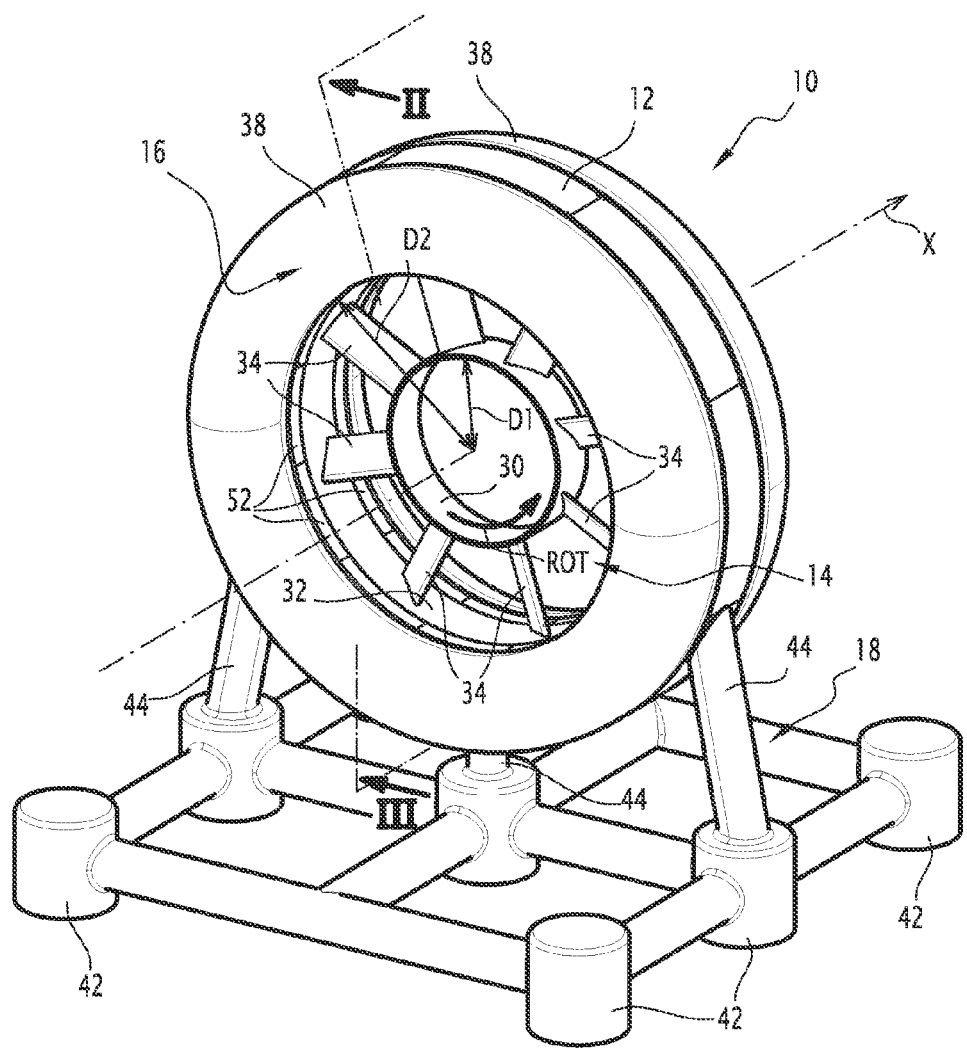
FIG. 1 is a perspective view of a hydrokinetic turbine generator, according to an embodiment of the invention, comprising a stator and a rotor.

In FIG. 1, a hydrokinetic turbine generator 10 comprises a stator 12, a mobile rotor 14 in rotation around a longitudinal axis X, oriented from back to front, a flow nozzle 16 and a support 18 of the stator.

Figure 2:
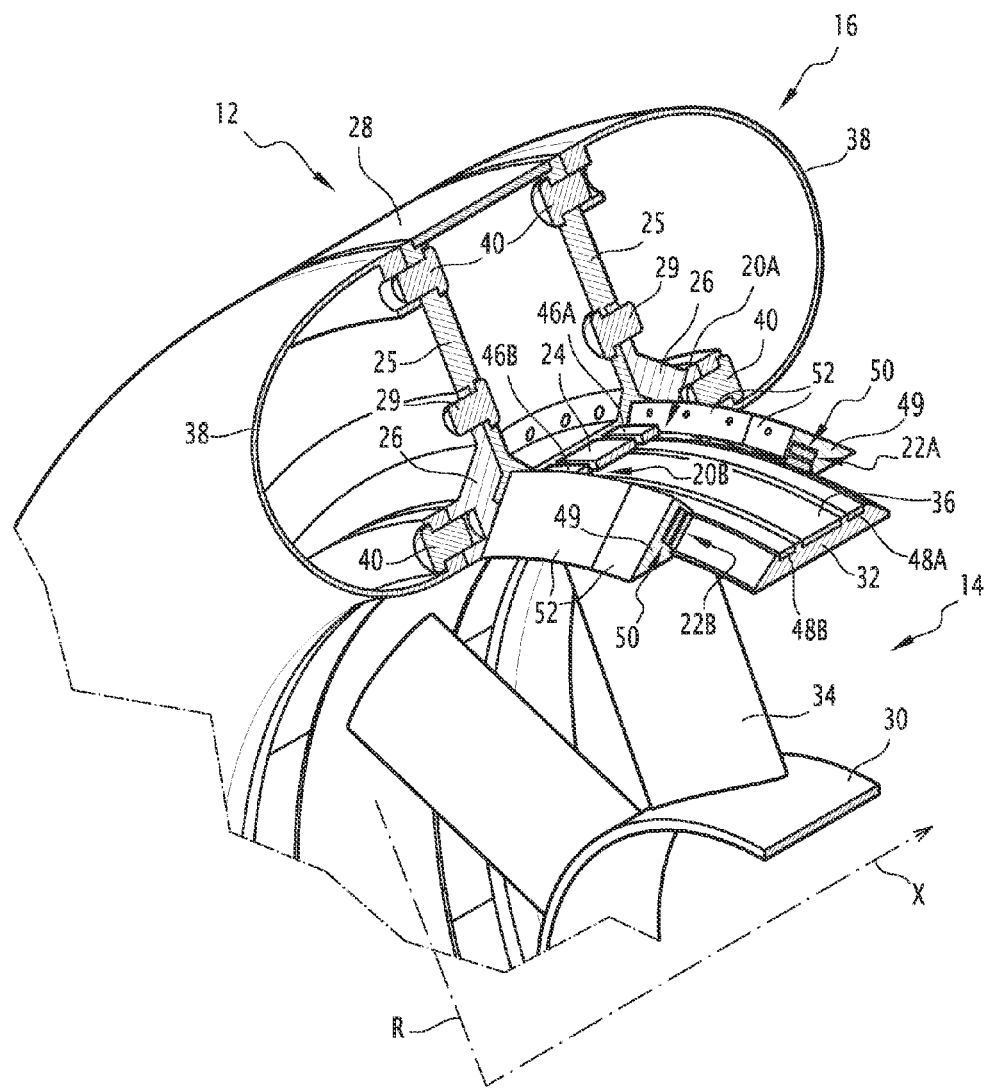
FIG. 2 is a partial and perspective cross-section view according to plane II of FIG. 1.

The hydrokinetic turbine generator 10 also comprises two first bearings 20A, 20B and two second bearings 22A, 22B to support the rotor 14, as shown in FIG. 2.

The hydrokinetic turbine generator 10 is capable of transforming the kinetic energy of the current of a liquid circulating inside the flow nozzle 16 in the longitudinal direction X into electric energy, the current bringing the rotor 14 in rotation around the X axis, and the rotation of the rotor 14 in relation to the stator 12 and thus generating electric energy.

The hydrokinetic turbine generator 10 is, for example, an underwater turbine designed to use the kinetic energy of sea currents. As an alternative, the hydrokinetic turbine generator is designed to be immersed in a stream of water, in order to convert the hydraulic energy of the water stream into electric energy.

The stator 12 is in the shape of a ring revolving around the longitudinal axis X. The stator 12 comprises an active statoric part 24.

Figure 3:
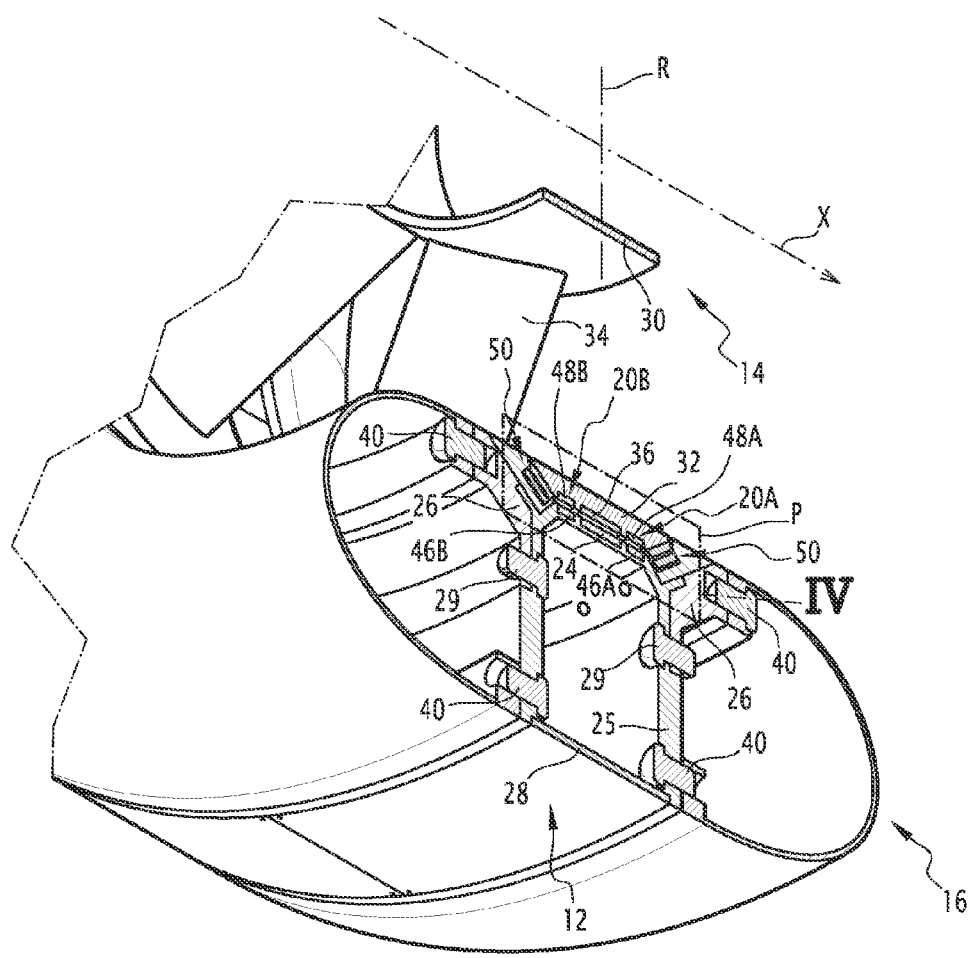
FIG. 3 is a partial and perspective cross-section view according to plane III of FIG. 1.

In the example of FIG. 2 and FIG. 3, the stator 12 comprises a main body 25, clamp plates 26 for fixing the flow nozzle, and detachable plates 28 to access the inside of the stator. The clamp plates 26 are joined to the main body 25 by using attachment means 29, such as screws.

The rotor 14 comprises an interior ring 30, an exterior ring 32 and various blades 34 extending in a radial direction R, perpendicular to the X axis of rotation, between the interior ring 30 and the exterior ring 32, as shown in FIG. 1. In the embodiment described, the rotor 14 comprises eight blades 32 distributed angularly on the outer periphery of the interior ring 30. The angular deviation between the two successive blades 34 is roughly equal to 45°.

The rotor 14 also comprises an active rotoric part 36, visible in FIG. 2, arranged on the outer periphery of the exterior ring 32 and capable of working together with the active statoric part 24, in order to generate a magnetic field when the rotor 14 is in rotation around the X axis and inside the stator 12, and thus to create electric energy. The active rotoric part 36 is located roughly opposite to the active statoric part 24 in the radial direction R.

The flow nozzle 16 comprises two half-nozzles 38 attached on both sides of the stator 12 in the longitudinal direction X, as shown in FIG. 1. The flow nozzle 16 is in the shape of a torus of revolution around the longitudinal X axis, the torus presentation an oblong-shaped transversal section. Each half-nozzle 38 presents, in a section following a longitudinal plane parallel to the X axis, a U-shaped form, one end of the U-shaped form being attached to the body 25 of the stator and the other end of the U-shaped form being attached to the corresponding clamp plate 26 by the attachment 40, such as screws, as shown in FIG. 2.

The support 18 comprises various support pins 42 on the ground and three vertical support arms 44 of the stator spaced from the ground. The support 18 comprises, for example, a tubular frame.

The two first bearings 20A, 20B are spaced from each other along the X axis of rotation. The first bearing 20A is also called first front bearing, and the first bearing 20B is also called first rear bearing.

In the example of FIG. 2 and FIG. 3, the two first bearings 20A, 20B are located opposite to the active statoric 24 and rotoric 36 parts following the X axis of rotation.

Each first bearing 20A, 20B also comprises a magnetic statoric element 46A, 46B joined to the stator 12 as well as a magnetic rotoric magnet 48A, 48B joined to the rotor 14.

The magnetic elements 46A, 48A forming the first front bearing 20A are also called front magnetic elements, and the magnetic elements 46B, 48B forming the rear first bearings 20B are also called rear magnetic elements.

Each first bearing 20A, 20B is, for example, a passive magnetic bearing. Each first bearing 20A, 20B comprises permanent magnets.

The two second bearings 22A, 22B are spaced from each other following the X rotation axis. The second bearing 22A is also called second front bearing, and the second bearing 22B is also called the second rear bearing.

In the example of FIG. 2 and FIG. 3, the two second bearings 22A, 22B are located on both sides of the active statoric 24 and rotoric 36 parts along the longitudinal X axis. The two second bearings 22A, 22B are more particularly located on both sides of the first bearings 20A, 20B along the longitudinal X axis.

Each second bearing 22A, 22B comprises a body 49 and various rolling elements 50 distributed around the outer periphery of the rotor 14 and mechanically attached to the body 49. In addition, the various rolling elements 50 are placed in at least two distinct rows, not shown, each row being arranged roughly according to a plane perpendicular to the X axis of rotation.

Figure 5:
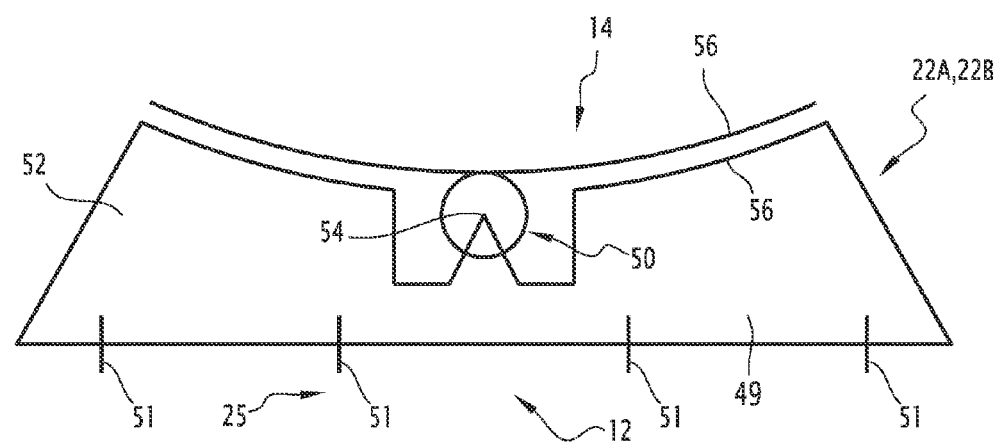
FIG. 5 is a very schematic representation of one sector of a supporting bearing of the rotor of the hydrokinetic turbine generator of FIG. 1.

In the embodiment described, each second bearing 22A, 22B is attached to the stator 12, for example to its main body 25 by using means of attachment 51, such as screws, as shown in FIG. 5. In addition or as an alternative, each second bearing 22A, 22B is attached to the clamp plate 26.

As an alternative that is not shown, each second bearing 22A, 22B is attached to the rotor 14.

Each second bearing 22A, 22B comprises various sectors 52 located successively around the longitudinal X axis so as to form a ring revolving around the longitudinal X axis. The number N of sectors 52 for each second bearing 22A, 22B is between 8 and 64.

The number N of the sectors 52 is more particularly an increasing function of the diameter of the hydrokinetic turbine generator 10 in the radial direction R, in order to limit the size and the mass of each sector 52. In other words, the number N is even greater when the diameter of the hydrokinetic turbine generator 10 is larger.

Additionally, each second bearing 22A, 22B is capable of supporting the rotor 14 while also following the direction of the X axis of rotation and following the radial direction R, meaning axially and radially at the same time.

The interior ring 30 and the exterior ring 32 are each in the shape of a cylindrical tube revolving around the longitudinal X axis. The interior ring 30 and the exterior ring 32 are centered on the longitudinal X axis. The length of the interior ring 30 and the length of the exterior ring 32 along the longitudinal direction X are, for example, roughly equal. Alternatively, the length of the interior ring 30 and the length of the exterior ring 32 along the longitudinal direction X are different.

The interior ring 30 presents a first diameter D1 in the plane perpendicular to the X axis, and the exterior ring 32 presents a second diameter D2 longer than the first diameter D1. The number N of the sectors 52 is more particularly an increasing function of the second diameter D2.

The value of the first diameter D1 is, for example, comprised between 2,000 mm and 8,000 mm. The value of the second diameter D2 is, for example, comprised between 4,000 mm and 18,000 mm Each rolling element 50 is mobile in rotation around a rolling axis T, the rolling axis T being located in a longitudinal plane P parallel to the longitudinal X axis.

Figure 4:
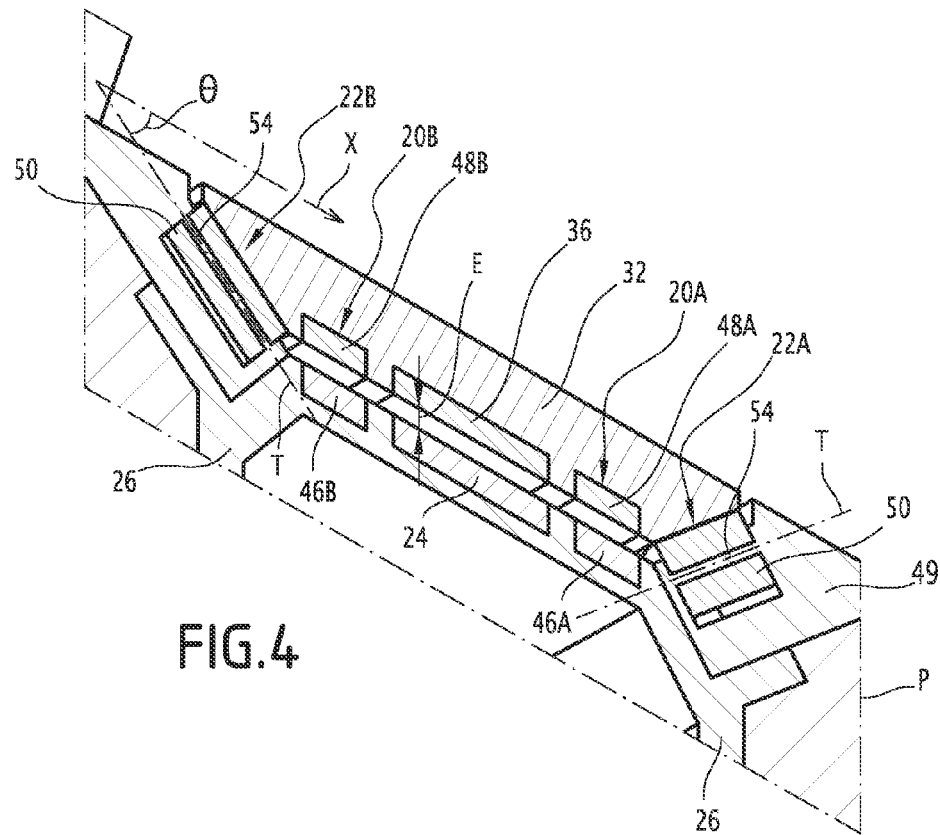
FIG. 4 is an enlargement of framed area IV of FIG. 3.

In the embodiment example of FIG. 4, each rolling element 50 is a mobile roller in rotation around a rod 54 joined to the body 49 of the corresponding second bearing. The roller is cylindrical. In a non-represented alternative variant, the roller is conical.

In a non-represented alternative variant, the rolling element 50 does not comprise a rod and is kept in a cage.

In a non-represented alternative variant, the rolling element 50 is a needle-type roller.

In a non-represented alternative variant, the rolling element 50 is a bead.

The rolling element 50 is more particularly made of steel, such as stainless steel. Alternatively, the rolling element 50 is made of aluminum, plastic material, polyetheretherketon (also called PEEK), composite material, or ceramic.

Since each second bearing 22A, 22B is capable of supporting the rotor 14 both in the direction of the X axis of rotation and in the radial direction R, meaning both axially and radially, and the rolling element 50 is cylindrically shaped, namely a cylindrical roller, cylindrical needle, or bead-shaped element, the rolling axis T is inclined in relation to the X axis of rotation, as shown in FIG. 2 through FIG. 4. The angle Θ between the rolling axis T and the X axis of rotation is always greater than 0° and always less than 90°. The value of the angle Θ is more particularly comprised between 30° and 60°, even more particularly, roughly equal to 45°.

Since each second bearing 22A, 22B is capable of supporting the rotor 14 both axially and radially, and the rolling element 50 is cone-shaped, namely a conic roller or a conic needle, the rolling axis T is inclined in relation to the X axis of rotation or is parallel to the X axis of rotation, the axial support then being assured by the conic shape of the rolling element 50.

In the embodiment example of FIG. 2 and FIG. 3, each second bearing 22A, 22V is joined to the stator 12, and each rolling element 50 is mechanically connected to the stator 12 and applied against the rotor 14. In a variant, each second bearing 22A, 22B is joined to the rotor 14, and each rolling element 50 is then mechanically connected to the rotor 14 and applied against the stator 12.

Each sector 52 comprises at least one rolling element 50, more particularly two to eight rolling elements 50. In the embodiment example of FIG. 2, each sector 52 comprises 3 rolling elements 50.

In addition, each sector 52 comprises various rolling elements 50, the various rolling elements 50 being placed in at least two distinct rows, not shown, more particularly in two to three rows. Each row is arranged roughly in a plane that is perpendicular to the X axis of rotation. Each rolling element 50 of a row is arranged roughly facing a rolling element of another row in the X axis of rotation. In a variant, the rolling elements 50 are in a staggered arrangement from one row to the other.

Each sector 52 is independently detachable from the other sector(s) 52 of the second corresponding bearing 22A, 22B.

In the example of FIG. 2, each sector 52 is, in other words, detachable from the stator 12 independently of the sector(s) 52. As a non-shown alternative variant, when each second bearing 22A, 22B is attached to the rotor 14, each sector 52 is detachable from the rotor 14 independently of the other sector(s) 52.

In addition, the second bearings 22A, 22B and the stator 12 each present a stopping surface 56, the stopping surfaces 56 being placed opposite to one another, as shown in FIG. 5. The stopping surfaces 56 are capable of coming in contact with one another in case of deterioration of at least one rolling element 50, so that the air gap E between the active statoric part 24 and the active rotoric part 36 is always greater than a minimum predetermined value.

As a non-shown alternative variant, when the second elements 22A, 22B are joined to the rotor 14, the second bearings 22A, 22B and the rotor 14 each present a stopping surface, the stopping surfaces being placed opposite to one another. Similarly, the stopping surfaces are capable of coming in contact with one another in case of deterioration of at least one rolling element 50, so that the air gap E is always greater than the minimum predetermined value.

The functioning of the hydrokinetic turbine generator 10 according to an embodiment of the invention will now be explained.

When the hydrokinetic turbine generator 10 is placed in water current, the current exercises pressure onto the blades 34 which brings the rotor 14 in rotation around the longitudinal X axis in the direction of the ROT arrow (FIG. 1). The rotation speed is initially low and increases as the water runs along the blades 34.

The active rotoric part 36 is then mobile in relation to the active statoric part 24, which produces a magnetic field and induces an electric current in the stator 12. The electric energy, thus generated by the hydrokinetic turbine generator 10 from the hydraulic energy of the current, is then transmitted toward a power grid system.

The hydrokinetic turbine generator 10 allows over 100 kW of power to be released for the rotation speeds of the rotor 14, for example comprised between 20 and 40 turns per minute.

When the rotor 14 is in rotation around the longitudinal X axis, the first bearings 20A, 20B and the second bearings 22A, 22B permit to support and position the rotor 14 in the radial direction R, perpendicular to the longitudinal axis X.

Additionally, the second bearings 22A, 22B permit to support and position the rotor 14 along the longitudinal X axis.

The first and second bearings 20A, 20B, 22A, 22B also support the rotor 14 when it is stopped, whether it is immersed or not.

The presence of the second bearings 22A, 22B permits to improve the support of the rotor 14 supplementing the first bearings 20A, 20B, namely when the hydrokinetic turbine generator 10 is not immersed.

In addition, the second bearings 22A, 22B permit to facilitate the start of the rotation of the rotor 14 by virtue of the rolling elements 50, which permits to achieve a general improvement of the performance of the hydrokinetic turbine generator 10 no matter what the direction of the water current is in the longitudinal direction X.

In addition, when the rolling axis T of each rolling element 50 is inclined in relation to the X axis of rotation, the second bearings 22A, 22B also serve as an axial stop, in order to permit the positioning of the rotor 14 according to the longitudinal axis X.

Furthermore, the presence of the stopping surfaces 56 allows for, in case of deterioration of one or several rolling elements 50, to limit the movement of the rotor 14, the stopping surfaces 56 coming then in contact with one another before the active statoric part 24 gets too close to the active rotoric part 36.

This then makes sure that the air gap E between the active statoric part 24 and the active rotoric part 36 is always greater than the minimum predetermined value. In other words, the stopping surfaces 56 help prevent the deterioration of the active statoric 24 and rotoric 36 parts in case of one or several rolling parts 50 are damaged.

The maintenance of the hydrokinetic turbine generator is also facilitated by the sectors 52 which are independently detachable from one another. Actually, in the event of wear or deterioration of a rolling element 50 for a given second bearing 22A, 22B, one must simply detach the sector 52 for which the rolling element 50 is worn or deteriorated, without having to disassemble the other sectors 52 from the given second bearing 22A, 22B. The sector 52 containing the worn or deteriorated rolling element may then be replaced by a new sector 52 or repaired.

Therefore, it is clear that the hydrokinetic turbine generator 10, according to embodiments of the invention, permits to facilitate the assembly, the start-up and the testing of the correct functioning after its manufacturing, while offering simplified maintenance.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A hydrokinetic turbine generator, comprising:
   a stator having an active statoric part, the stator forming a first stopping surface;
   a rotor configured to be brought in rotation around a first axis of rotation by a flow of a liquid, the rotor having an active rotoric part opposite to the active statoric part in a radial direction to generate a magnetic field during rotation of the rotor around the first axis of rotation; and
   at least one support bearing having at least one rolling element to support the rotor, the at least one support bearing forming a second stopping surface positioned opposite to the first stopping surface,
   wherein the first stopping surface and the second stopping surface are configured to come in contact with one another in case of deterioration of the at least one rolling element to maintain an air gap between the active statoric part and the active rotoric part.

2. The hydrokinetic turbine generator of claim 1, wherein the at least one support bearing has sectors arranged successively around the first axis of rotation so as to form a ring revolving around the first axis of rotation.

3. The hydrokinetic turbine generator of claim 2, wherein each sector is independently detachable from the sectors of the respective support bearing.

4. The hydrokinetic turbine generator of claim 1, wherein the at least one rolling element is mobile in rotation around a second axis of rotation.

5. The hydrokinetic turbine generator of claim 4, wherein an angle between the first axis of rotation and the second axis of rotation is between 30° and 60°.

6. The hydrokinetic turbine generator of claim 4, wherein an angle between the first axis of rotation and the second axis of rotation is about 45°.

7. The hydrokinetic turbine generator of claim 1, wherein the at least one rolling element defines at least two different rows.

8. A hydrokinetic turbine generator, comprising:
   a stator having an active statoric part, the stator forming a first stopping surface;
   a rotor configured to be brought in rotation around a first axis of rotation by a flow of a liquid, the rotor having an active rotoric part opposite to the active statoric part in a radial direction to generate a magnetic field during rotation of the rotor around the first axis of rotation; and
   support bearings to support the rotor, and which form a second stopping surface positioned opposite to the first stopping surface, wherein the support bearings are spaced apart from each other along the first axis of rotation and have at least one rolling element mobile in rotation around a second axis of rotation that is different than the first axis of rotation,
   wherein the first stopping surface and the second stopping surface are configured to come in contact with one another in case of deterioration of the at least one rolling element to maintain an air gap between the active statoric part and the active rotoric part.

9. The hydrokinetic turbine generator of claim 8, wherein the support bearings each have sectors arranged successively around the first axis of rotation so as to form a ring revolving around the first axis of rotation.

10. The hydrokinetic turbine generator of claim 9, wherein each sector is independently detachable from the sectors of the respective support bearing.

11. The hydrokinetic turbine generator of claim 9, wherein the at least one rolling element is mobile in rotation around a second axis of rotation.

12. The hydrokinetic turbine generator of claim 11, wherein an angle between the first axis of rotation and the second axis of rotation is between 30° and 60°.

13. The hydrokinetic turbine generator of claim 11, wherein an angle between the first axis of rotation and the second axis of rotation is about 45°.

14. The hydrokinetic turbine generator of claim 9, wherein the at least one support bearing and the stator each form a stopping surface positioned opposite to one another.

15. The hydrokinetic turbine generator of claim 14, wherein the stopping surfaces are configured to come in contact with one another in case of deterioration of the at least one rolling element to maintain an air gap between the active statoric part and the active rotoric part.

16. The hydrokinetic turbine generator of claim 9, wherein the at least one rolling element defines at least two different rows.

17. A hydrokinetic turbine generator, comprising:
    a stator having an active statoric part, the stator forming a first stopping surface;
    a rotor configured to be brought in rotation around a first axis of rotation by a flow of a liquid, the rotor having an active rotoric part opposite to the active statoric part in a radial direction to generate a magnetic field during rotation of the rotor around the first axis of rotation; and
    at least one support bearing having at least one rolling element to support the rotor, the support bearing having sectors arranged successively around the first axis of rotation so as to form a ring revolving around the first axis of rotation, the at least one support bearing forming a second stopping surface positioned opposite to the first stopping surface,
    wherein the first stopping surface and the second stopping surface are configured to come in contact with one another in case of deterioration of the at least one rolling element to maintain an air gap between the active statoric part and the active rotoric part.

* * * * *